United States Patent [19]

Striegl

[11] 4,425,063

[45] Jan. 10, 1984

[54] REAMER WITH A FLAT RECTANGULAR REVERSIBLE CUTTING BIT

[76] Inventor: Georg Striegl, Liststrasse 29, 7472 Winterlingen, Fed. Rep. of Germany

[21] Appl. No.: 209,730

[22] Filed: Nov. 24, 1980

[30] Foreign Application Priority Data

Nov. 30, 1979 [DE] Fed. Rep. of Germany ....... 2948250

[51] Int. Cl.³ .................... B23B 41/00; B23B 51/10; B23P 23/02
[52] U.S. Cl. .................................. 408/81; 407/113
[58] Field of Search .............. 407/33, 36, 44, 48, 407/103, 104, 106, 113, 114; 408/146, 81, 173, 179, 186, 189, 191, 197, 713

[56] References Cited

U.S. PATENT DOCUMENTS

| | | | |
|---|---|---|---|
| 1,351,467 | 8/1920 | Chapin et al. | 407/113 |
| 2,598,581 | 5/1952 | McKenna et al. | 407/113 |
| 3,156,032 | 11/1964 | Lundgren | 407/114 |
| 3,226,797 | 1/1966 | Hertel | 407/104 |
| 3,376,763 | 4/1968 | Welles | 407/113 |
| 3,490,117 | 1/1970 | Hertel | 407/113 |
| 3,653,107 | 3/1972 | Hertel | 407/113 |
| 3,694,876 | 10/1972 | Erkfritz | 407/48 |
| 3,802,043 | 4/1974 | Garih | 407/36 |
| 4,074,949 | 2/1978 | Hochmuth et al. | 407/114 |
| 4,194,862 | 3/1980 | Zweekly | 408/713 |

FOREIGN PATENT DOCUMENTS 1427182  3/1960  Fed. Rep. of Germany ...... 408/186

Primary Examiner—E. R. Kazenske
Assistant Examiner—Paul M. Heyrana, Sr.

[57] ABSTRACT

The reamer has a flat rectangular reversible cutting bit which has a wide-side face, a wide-side contact surface parallel to said wide-side face and a narrow-side contact surface and possesses a cutting edge extending parallel to the longitudinal axis of a revolvable body and projecting above the circumferential surface of the body. The reversible cutting bit is mounted detachably in a recess of the revolvable body and makes contact with a supporting surface extending substantially in a radial direction and also with a base support extending at right angles to the former. The radial support surface of the revolvable body is narrower than the base support of the recess. The wide-side contact surface of the reversible cutting bit makes contact with the base support over a large area. The narrow-side contact surface of the reversible cutting bit is disposed at the radial support surface of the revolvable body. The wide-side face of the reversible cutting bit is disposed in secant-like fashion with respect to the body and the cutting edge projecting above the body is formed by the leading edge of the wide-side face extending in secant-like fashion and by a narrow-side clearance surface extending approximately radially in the body.

8 Claims, 3 Drawing Figures

REAMER WITH A FLAT RECTANGULAR REVERSIBLE CUTTING BIT

Reamer with a flat rectangular reversible cutting bit which has a wide-side face, a wide-side contact surface parallel to said wide-side face and a narrow-side contact surface and which possesses a cutting edge extending parallel to the longitudinal axis of a body of revolution and projecting above the circumferential surface of the body of revolution, with the reversible cutting bit being mounted detachably in a recess of the parent body and at the same time making contact with a supporting surface extending substantially in a radial direction and also with a base support extending at right angles to the former.

BACKGROUND OF THE INVENTION

In the case of a known reamer of this type (German Patent Application No. 1 427 182) it is considered a shortcoming that the flat reversible cutting bit extending with its plane substantially radially to the body of revolution fails under heavy stresses to introduce the force occurring during the reaming process into the body of revolution with sufficient reliability. There exits then the danger of scoring. The reversible cutting bit adjoins with one wide-side contact surface the radial supporting surface of the body of revolution and projects above its external circumferential surface. Since the bending strength of the reversible cutting bit in the direction vertically to its surface plane is relatively low, it can be expected that in the case of a frictional stress the brittle reversible cutting bit may fracture.

The reversible cutting bit is secured in the recess of the body of revolution by way of a clamping shoe. This clamping shoe is tightened by a screw. The clamping shoe then presses against a wide-side surface of the reversible cutting bit. The fastening of the reversible cutting bit to the body of revolution is, therefore, time-consuming. Another shortcoming is due to the fact that the clamping shoe disposed in front of the reversible cutting bit requires a considerable amount of space in the recess of the body of revolution. The free chip space in the body of revolution ahead of the reversible cutting bit is, therefore, correspondingly smaller. As a result, working with this known reamer is made more difficult.

It is also considered a disadvantage that the narrow-side contact surface of the reversible cutting bit near the longitudinal axis of the body of revolution is supported by two piston-like adjusting bodies. As a result, only a two-point contact is provided which because of the small area is subject to a high stress. In addition, the accurate setting of the reversible cutting bit is exceedingly difficult and inconvenient because during the adjusting both the clamping shoe with its screw and the adjusting bodies with the associated threaded bolt act jointly and interfere with the accurate alignment of the reversible cutting bit. In this case, basically the following operations have to be carried out: Loosening of the adjusting screws, retracting the clamping shoe, insertion of the cutting bit, tightening the clamping shoe with the differential screw, moving the adjusting elements up to the cutting bit by adjusting screws, measuring the diameter of the reamer (micrometer), adjusting the desired dimension by turning the adjusting screws with the clamping shoe tightened. If during this procedure the reaming diameter has been set too large, the whole process has to be repeated. On the whole, therefore, the known reamer is expensive to manufacture and has a complicated structure as a result of which particularly the accurate alignment of the reversible cutting bit is made difficult and the latter is during actual reaming operations subjected to vibratory stresses with the danger of fracture at the point of mounting in the body of revolution.

OBJECTS AND STATEMENT OF THE INVENTION

The invention is accordingly based on the objective of improving a reamer of the kind described above in such a way that with simple means and with the elimination of complicated components a secure support of the reversible cutting bit at the body of revolution and a consistent force transfer from the cutting edge of the reversible cutting bit via its narrow-side contact surface into the body of revolution is obtained.

This problem is solved according to the invention by the fact that the radial support surface of the body of revolution is narrower than the base support of the recess, that the wide-side contact surface of the reversible cutting bit makes contact with the base support over a large area, that the narrow-side contact surface of the reversible cutting bit is disposed at the radial supporting surface of the body of revolution, that the wide-side face of the reversible cutting bit is disposed in secant-like fashion with respect to the body of revolution and that the cutting edge projecting above the body of revolution is formed by the impact edge of the wide-side face extending in secant-like fashion and by a narrow-side clearance extending approximately radially in the body of revolution.

The invention provides the following advantages:

(a) The reversible cutting bit extends with its wide-side surface plane approximately tangentially to the circumference of the body of revolution of the reamer.

(b) The force attacking at the cutting edge is introduced into the body of revolution basically at a slight angle to the plane of the reversible cutting bit by the latter at the rearward narrow-side contact surface via the radial supporting surface of the body of revolution which is at right angles to the direction of the force.

(c) Due to the practically full-face contact of the wide-side contact surface with the base support of the body of revolution an absolutely secure bearing support radially in the direction of the longitudinal center axis of the body of revolution is obtained. The area-specific strain is relatively small.

(d) No complicated adjustment operations for aligning the reversible cutting bit, particularly during the changing of the cutting edge, are necessary.

(e) The free chip space in the body of revolution ahead of the reversible cutting bit can, due to the disposition according to the invention, be made quite large. This results in a high operating efficiency since the chips can run off freely.

(f) Due to the compact embedding of the reversible cutting bit in the body of revolution, stress loads in the body of the reamer are largely avoided, even at high output.

(g) The tangential arrangement and step bearing of the reversible cutting bit in the recess of the body of revolution is absolutely free of flutter and vibration and is accomplished with the simplest means. No complicated components such as clamping shoes and piston-like adjustment bodies are required. A reversal of the reversible cutting bit can be carried out quickly and simply. No time-consuming alignment operations are required.

(h) Because of its large width and small height at right angles to the applied stress, the reversible cutting bit possesses a high resistance to rupture and a long service life.

(i) A tapering or tilting of the reversible cutting bit according to the Morse cone does not have to be adjusted separately. In the reversible cutting bit, the taper has already been ground in at the manufacturing plant. Nothing can be done wrong. No matter how the reversible cutting bit is inserted, the taper is always correct because the bevel has been ground properly.

Advantageously, the invention has the following additional features:

Said recess in said revolvable body has a base surface and said base support comprises a replaceable rectangular flat shim disposed in said recess of said revolvable body between said wide-side contact surface of said reversible cutting bit and said base surface. The result is that the seat of the reversible cutting bit can be varied radially in the revolvable body so that by inserting different, precisely gauged shims a sensitive adaptation and accurate setting of the reversible cutting bit is possible. The reamer is preferably supplied with four shims with 5 μm graduations. This makes it possible to compensate for tolerances and to accurately adjust the applicable reaming diameter.

A corner notch is formed in the corner region of said radial support surface and said base surface. Thus, a free space is created for the longitudinal edge of the shim in the corner region of the recess of the revolving body.

A lateral notch is formed in said radial support surface, in the region of the plane of said wide-side contact surface of said reversible cutting bit. Thus, a free space is created for the lower longitudinal edge of the reversible cutting bit when the latter is in contact with the supporting surface.

Said reversible cutting bit has four cutting edges running parallel to each other. A high degree of economy is achieved. A total of four cutting edges is available. A cost-saving, far-reaching utilization of the reversible cutting bit is achieved before the latter must be replaced by a new reversible cutting bit.

Said reversible cutting bit has a support web at said narrow-side contact surface and at said narrow-side clearance surface. Through these characteristics, a secure support of the reversible cutting bit is achieved in the tangential direction at the narrow side.

Said support webs are disposed in the center plane of said reversible cutting bit, inclined toward the axis, and said cutting edge has a reset rake inclined in the direction toward said support web with the angle between said rake and said wide-side contact surface and said wide-side face resp., being smaller than 90°. Through these characteristics, a uniform support of the reversible cutting bit is achieved in the tangential direction exactly in the region of the center plane and a high cutting rate by the cutting edges is attained.

Said two support webs are ground plane parallel to each other at said narrow-side contact surface and said narrow-side clearance surface. Through these characteristics a perfect support alignment is realized after a change of the cutting edge by turning the reversible cutting bit around.

Said reversible cutting bit has cutting edges associated with both said narrow-side contact surface and said narrow-side clearance surface, and both at said narrow-side contact surface and at said narrow-side clearance surface said support web and the respective cutting edges are disposed in a common plane. Thus, uniform external spacings are achieved which is desirable both for the fabrication of the reversible cutting bit and for their accommodation in the step support in the revolvable body.

Said reversible cutting bit has a forward and a rearward narrow face side having a total of four free ground surfaces commencing at said cutting edges. Thus, an optimal cutting performance is attained at all four cutting edges of the reversible cutting bit.

Said reversible cutting bit has a center bore and a countersunk screw therein capable of being screwed into said revolvable body, and possesses both at said wide-side face and at said wide-side contact surface a countersunk head receiver, tapered in the direction toward the center plane of said reversible cutting bit. Through these characteristics, a positioning of the reversible cutting bit in the recess of the revolvable body is achieved by simple means. In this case, the covered seating of the screw is still maintained even after the reversing of the bit.

Said reversible cutting bit has at the taper circumference to said two countersunk head receivers one stepped recess each. Thus, a free space is created for the flat head of the positioning screw in the region of the taper at the reversible cutting bit.

Said reversible cutting bit has a narrow end face side and said revolvable body has a borehole, and a kingpin is adjustably seated in said kingpin borehole and an eccentric head carried on said kingpin supports said cutting bit at said narrow end face. Through these characteristics, a continuous matching of a support at the rearward narrow face side of the reversible cutting bit is achieved.

Said kingpin carrying said eccentric head has a conical form. Thus, a safe arrest of the accurately set eccentric head is achieved.

Said eccentric head has a threaded bore extending as far as said kingpin for accommodating an auxilliary screw. Thus it is possible that an auxilliary means is available for the precise fine adjustment and the support of the eccentric head at the rearward narrow face side of the reversible cutting bit.

Said countersunk screw of said reversible cutting bit and a kingpin carrying an eccentric head are disposed reaially in said revolvable body and also one behind the other in the longitudinal direction of said revolvable body. Through these characteristics, a favorable arrangement of the positioning means at the body of revolution of the reamer is obtained.

Said countersunk screw in said revolvable body is screwed in at such an angle that it extends with its free end both somewhat in the direction toward said kingpin and somewhat in the direction toward an extension of said radial support surface. Thus, it is possible that because of the slope of the thread in the parent body of the reamer, the the reversible cutting bit is in foolproof contact, that is, in any case after the tightening of the countersunk screw at the eccentric head, with the supporting surface and with the base support and, is therefore, positioned exactly from reversal to reversal.

DESCRIPTION OF THE DRAWINGS

In the following, the invention is described in greater detail by means of a preferred embodiment shown on the drawing where.

DETAILED DESCRIPTION OF PREFERRED EMBODIMENT

Figure 1:
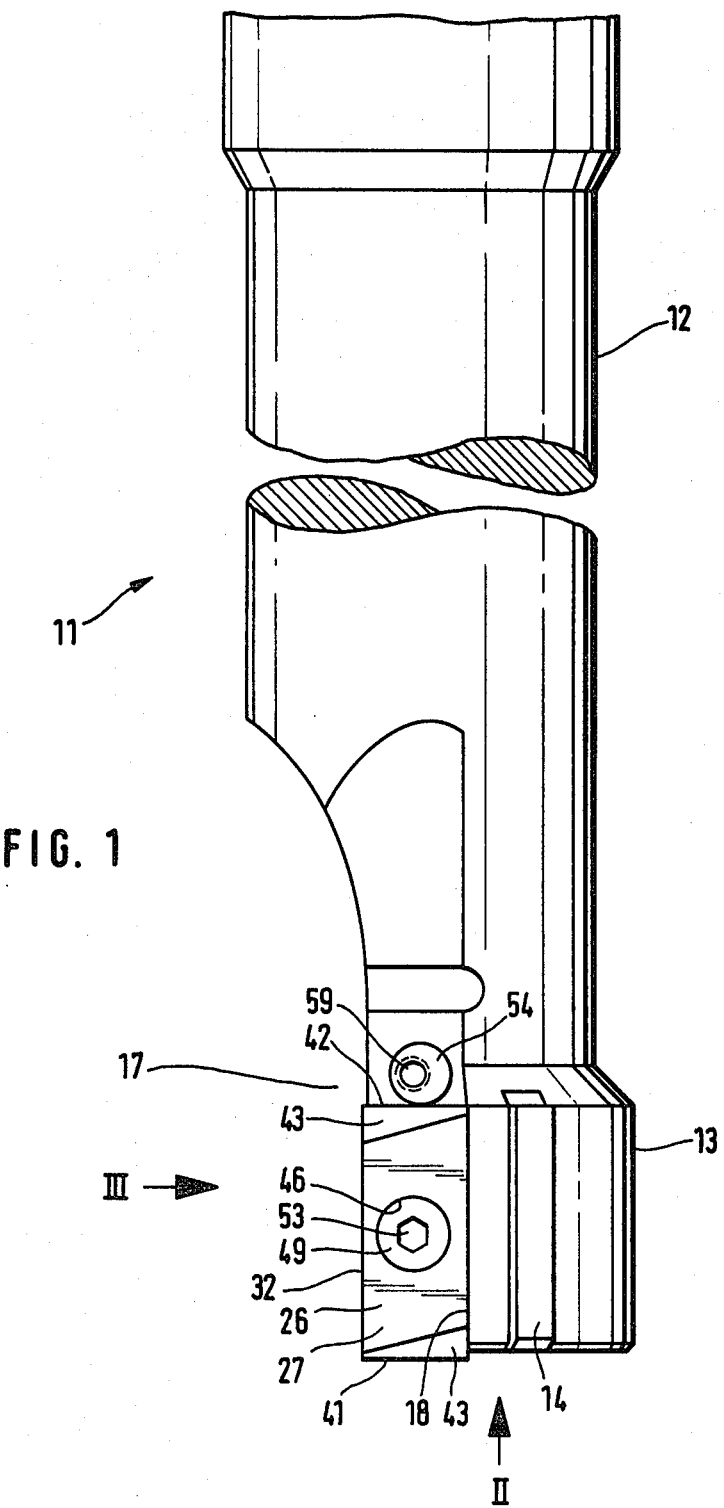
FIG. 1 shows a reamer according to the invention in twofold enlargement.

The reamer 11 shown on the drawing has a shank 12 with a body of revolution 13. The body of revolution 13 has along its circumference two guide bars 14. In addition, the body of revolution 13 has a recess 16 and a clear chip space 17. The clear chip space 17 comprises about ⅓ of the cross-section of the body of revolution 13 so that much room is available for a satisfactory chip run-off.

The recess 16 is bounded by a support surface 18 and a basal surface 19. The support surface 18 extends approximately radially and, therefore, substantially vertically to the direction of rotation of the body of revolution 13. The basal surface 19 is disposed at right angles to the supporting surface 18. In the corner region of the supporting surface 18 and of the basal surface 19. a corner slot 21 is formed in the shape of a rectangular groove. In the body of revolution 13 there is also a lateral recess 22 open at the supporting surface 18 which is likewise designed as a rectangular groove.

Figure 2:
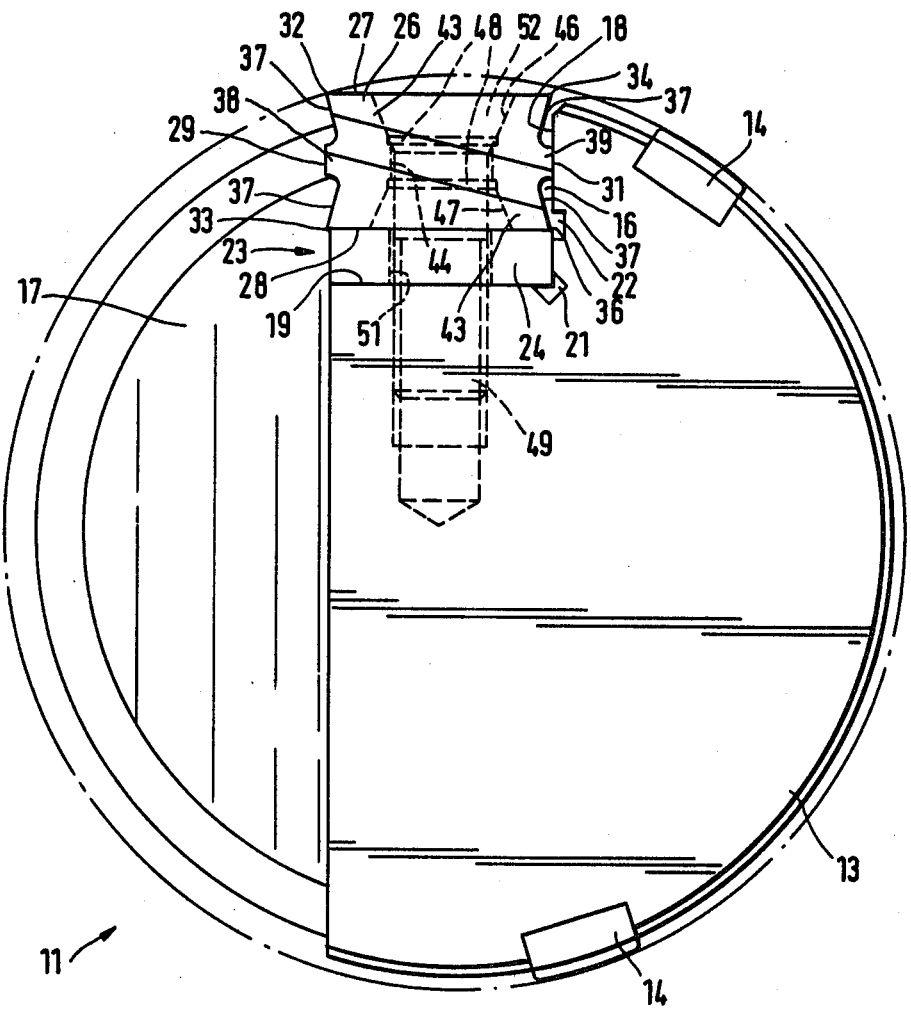
FIG. 2 is a view according to the arrow II of the frontal face of the body of revolution of the reamer according to FIG. 1 shown on an enlarged scale and FIG. 3 is a partial side view according to the arrow II of the body of revolution of the reamer according to FIG. 1 on an enlarged scale, partially in section.
Figure 3:
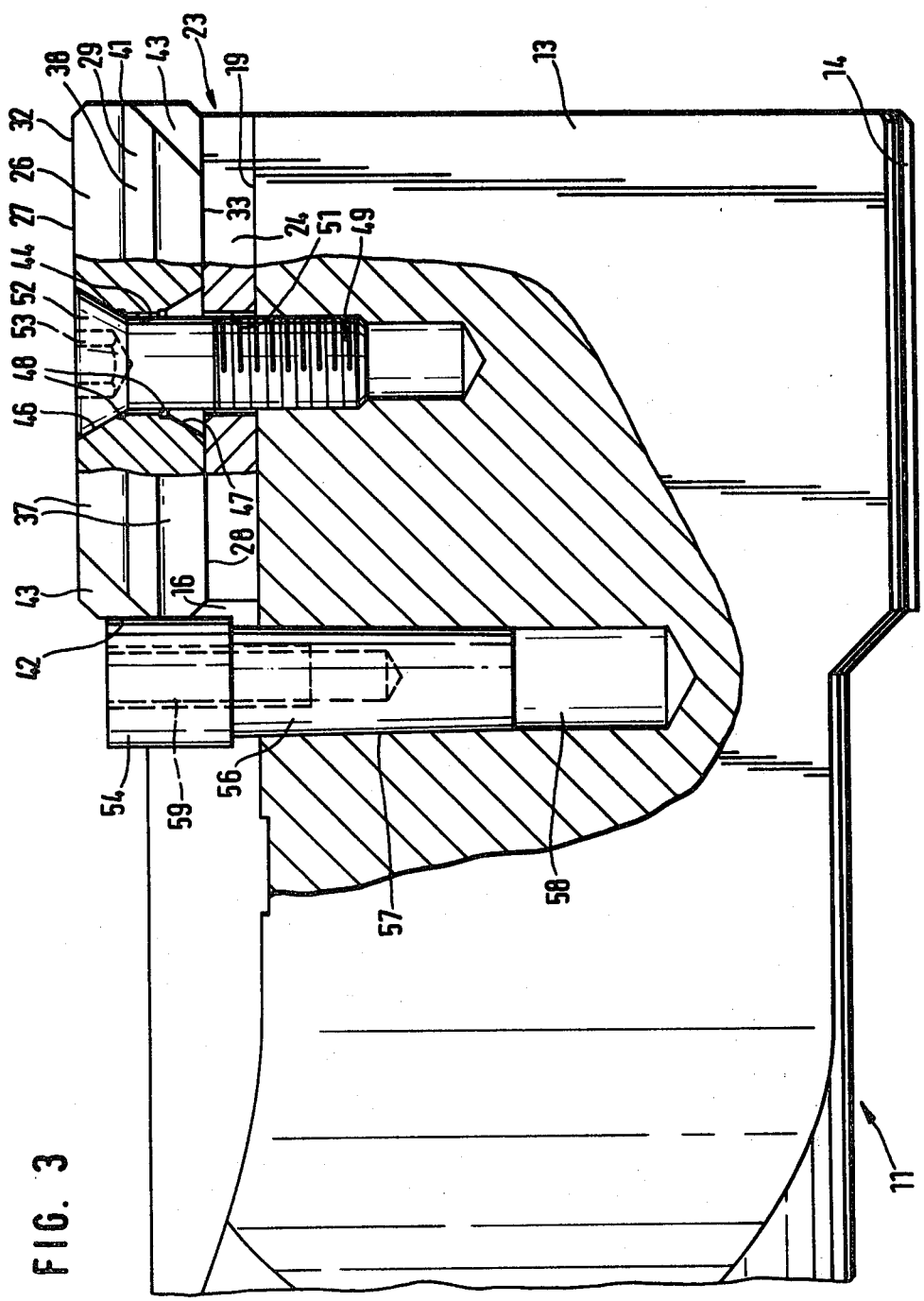

In the recess 16, there is base support 23 in the shape of a flat rectangular shim 24. It is made perfectly plane and rests on the basal surface 19. The width of the shim 24 corresponds in this case to approximately the width of the basal surface 19. FIG. 2 shows that the one lower longitudinal edge of the shim 24 is situated in the region of the corner recess 21 and the upper longitudinal edge of the shim 24 in the region of the second recess 22.

In the region of the recess 16 of the body of revolution 13, a reversible cutting bit 26 is disposed in addition. The reversible cutting bit 26 lies with its plane parallel to the basal surface 19 and vertical to the supporting surface 18 of the body of revolution 13. It has an upper wide-side face 27, a lower wide-side contact surface 28 which runs exactly parallel to the wide-side face 27, a free narrow-side face 29 and a narrow-side contact surface 31 also running parallel to the latter. At the same time, the reversible cutting bit 26 rests with its lower wide-side contact surface 28 extensively against the shim 24. The upper wide-side surface 21, on the other hand, is completely free and extends in secant-like fashion with respect to the circumference of the body of revolution 13. The narrow-side contact surface 31 makes firm contact with the shim 18 which extends vertically to the machining force.

The reversible cutting bit 26 has at four edges running parallel to each other one cutting edge each 32, 33, 34, 36 which are co-formed by rakes 37. The rakes 37 are reset at an angle in the direction toward the center plane of the reversible cutting bit 26 and there change in the form of a circular arc into a support web 38, 39. The rakes are shaped in such a way that the angle between the rakes 37 and the wide-side surface 27 or the wide-side contact surface 28 amounts to about 73°. The narrow-side surface 29 and the narrow-side contact surface 31 are ground exactly plane parallel to each other and are formed by the free surfaces of the support webs 38, 39. In this case, the free narrow-side face 29 lies in a common plane with the cutting edges 32, 33 and the narrow-side contact surface 31 is similarly arranged in a common plane with the cutting edges 34, 36. Beyond this, the reversible cutting bit 26 has both at the forward narrow-face side 41 and at the rearward narrow-face side 42 two free ground surfaces each 43 which start from the cutting edges 32, 33, 34, 36.

The reversible cutting bit 26 has a center bore 44 extending at right angles to the plane. This center bore 44 has a countersunk head receiver 46 which starts from the wide-side surface 27 and tapers in the direction toward the center plane. Directly opposite is another countersunk head receiver 47 which starts from the wide-side contact surface 28 and tapers in the direction toward the center plane of the reversible cutting bit 26. In the region of the smallest diameter of the countersunk head receivers 46, 47 one annular stepped recess each 48 is formed. The reversible cutting bit 26 is detachably mounted on the body of revolution 13 by means of a countersunk screw 49 which passes through the center bore 44 and the shim 24 in a bore 51. The countersunk screw 49 has in its countersunk head 52 a hexagonal recess 53 for tightening.

Behind the reversible cutting bit 26, an eccentric head 54 is disposed at the body of revolution 13. The eccentric head 54 is situated on a kingpin 56 which has a cone 57. The kingpin 56 is firmly pressed into the borehole 58 of the body of revolution 13 and thus automatically locked in place. The eccentric head 54 has a threaded bore 59 which extends to the kingpin 56 and serves to accommodate an auxiliary screw by means of which the eccentric head 54 can be adjusted. The eccentric head 54 is with its circumferential surface in intimate contact with the rearward narrow-face side 42 of the reversible cutting bit 26 and a fine adjustment of the reversible cutting bit 26 in the longitudinal direction of the reamer 11 can be produced during mounting by a corresponding single turn of the eccentric head 54.

The countersunk screw 49 and the kingpin 56 extend, one behind the other, in the radial direction of the body of revolution 13. At the same time, the countersunk screw 49 is screwed into the body of revolution 13 at a slight angle so that, to be more specific, during the screwing in of the countersunk screw 49 the reversible cutting bit 26 is pressed not only against the base support 23 but at the same time also against the eccentric head 54 and the supporting surface 18.

I claim:

1. A reamer comprising:
   a revolvable body with a right-angled recess which has a base surface and a support surface substantially at right angles to said base surface, at least one of said base surface and said support surface being displaced from a radius of the revolvable body;
   a base support on said base surface having approximately the form of a rectangular prism with a precision ground upper side and a precision ground lower side and a bore;
   a reversible cutting bit on said base support having approximately the form of a rectangular prism, with an upper side and a lower side parallel to each other, four parallel cutting edges, a pair of parallel support webs on side surfaces of the bit, each support web lying between a pair of cutting edges, a clearance rake between each cutting edge and a neighboring support web, a bore at approximately the middle of said cutting bit, a countersunk recess on said middle bore extending from said upper side of said cutting bit, and a countersunk recess on said middle bore extending from said lower side of said cutting bit;

said cutting bit being arranged in said recess such that one of said upper and lower sides engages the upper side of the base support, said base support fixedly establishing a predetermined radial distance of the respective cutting edge from a longitudinal axis of said revolvable body, and one of said support webs abutting said support surface such that the force applied to the respective cutting edge by rotation of the revolvable body is at a slight angle to the plane of the upper surface; and a single screw with a countersunk head, which passes through said reversible cutting bit and said base support and is screwed into said base surface in said revolvable body to secure said reversible cutting bit and said base support on said base surface in said recess.

2. Reamer according to claim 1 wherein a corner notch is formed in the corner region of said support surface and said base surface.

3. Reamer according to claim 2, wherein a lateral notch is formed in said support surface in the region of the plane of said lower side of said reversible cutting bit.

4. Reamer according to claim 1, wherein said reversible cutting bit has a narrow end face side and said revolvable body has a borehole, and a kingpin is adjustably seated in said borehole and an eccentric head carried on said kingpin supports said cutting bit at said narrow end face.

5. Reamer according to claim 4 wherein said kingpin carrying said eccentric head has a conical form.

6. Reamer according to claim 5 wherein said eccentric head has a threaded bore extending as far as said kingpin for accommodating an auxiliary screw.

7. Reamer according to claim 1 wherein said countersunk screw of said reversible cutting bit and a kingpin carrying an eccentric head are disposed radially in said revolvable body and also one behind the other in the longitudinal direction of said revolvable body.

8. Reamer according to claim 7 wherein said countersunk screw in said revolvable body is screwed in at such an angle that it extends with its free end both somewhat in the direction toward said kingpin and somewhat in the direction toward an extension of said support surface.

* * * * *